United States Patent [19]

Summers et al.

[11] 4,057,519

[45] Nov. 8, 1977

[54] SODIUM SILICATE EXTENDED POLYURETHANE FOAM

[75] Inventors: John E. Summers, McMurray; John F. Hadley, Bradford Woods, both of Pa.

[73] Assignee: H. H. Robertson Company, Pittsburgh, Pa.

[21] Appl. No.: 641,077

[22] Filed: Dec. 15, 1975

Related U.S. Application Data

[63] Continuation-in-part of Ser. No. 503,288, Sept. 5, 1974, abandoned.

[51] Int. Cl.$^2$ .................. C08G 18/38; C08G 18/14
[52] U.S. Cl. .................... 260/2.5 AK; 260/2.5 BE; 260/2.5 F
[58] Field of Search ............. 260/2.5 AK, 2.5 BE, 260/2.5 F

[56] References Cited

U.S. PATENT DOCUMENTS

| | | | |
|---|---|---|---|
| 3,634,342 | 1/1972 | Boblitt | 260/2.5 AK |
| 3,975,313 | 8/1976 | Villa | 260/2.5 AK |
| 3,981,831 | 9/1976 | Markusch | 260/2.5 AM |
| 3,983,081 | 9/1976 | Dieterich | 260/2.5 AJ |

FOREIGN PATENT DOCUMENTS

| | | | |
|---|---|---|---|
| 1,419,552 | 10/1965 | France | 260/2.5 AK |
| 1,137,465 | 12/1968 | United Kingdom | 260/2.5 AK |

*Primary Examiner*—C. Warren Ivy
*Attorney, Agent, or Firm*—Harry B. Keck; George E. Manias

[57] ABSTRACT

Polyurethane foam products having relatively noncombustible properties, low flame spread ratings and low smoke generating tendencies when exposed to fire can be produced by combining aqueous sodium silicate into the foam forming composition which also includes a viscous, hydroxyl-terminated polyester and a polyisocyanate prepolymer or quasi-prepolymer along with a suitable catalyst, surfactant and halogenated alkane blowing agent. The aqueous sodium silicate ingredient constitutes from about 30 to 60 percent by weight. The aqueous sodium silicate has a weight ratio of $SiO_2/Na_2O$ of 2.4 to 3.0 and contains 25 to 75 percent by weight water. The resulting foam, with a density of 1.5 to 4.5 pounds per cubic foot, has a K-factor less than 0.26 and is useful as a thermal insulating substance, especially in building panels.

5 Claims, No Drawings

SODIUM SILICATE EXTENDED POLYURETHANE FOAM

CROSS-REFERENCES TO RELATED APPLICATIONS

This application is a continuation-in-part of our copending application Ser. No. 503,288, filed Sept. 5, 1974, now abandoned.

BACKGROUND OF THE INVENTION

1. Field of the Invention

This invention relates to aqueous sodium silicate extended polyurethane foam systems.

2. Description of the Prior Art

Polyurethane foam technology is a highly developed art. Sales of polyurethane foam in 1970 exceeded 1 billion pounds in the United States. In general polyurethane foam is produced by combining the following ingredients:

1. A polyisocyanate;
2. A polyol;
3. A blowing agent, normally a halogenated hydrocarbon;
4. A suitable catalyst for the reaction of —OH and —N=C=O groups;
5. A surfactant to control cell size and distribution.

Customarily a sufficient amount of polyisocyanate is provided to combine with the —OH groups of the polyol. The polyurethane foam has densities of about 2 pounds per cubic foot to about 40 pounds per cubic foot. The material has excellent thermal insulating properties. Polyurethane foam is available in both rigid and flexible forms.

In addition to the foregoing materials other additives may be employed such as:

1. Particulate fillers;
2. Fibrous fillers;
3. Pigments and dyes;
4. Fire retardant additives which may be coreactive and which may constitute a part of the polyol ingredient;
5. Water.

Polyurethane foams are employed as flotation elements for aquatic vessels, as thermal insulation for heat transfer barriers, as spacer members, as fillers and encapsulating materials for sealing cavities, as wall and ceiling coverings, and as packaging materials, and other uses.

U.S. Pat. No. 3,607,794 (issued Sept. 21, 1971) concerns the production of silicate foams by reacting an aqueous sodium silicate with a polyisocyanate in the absence of a preformed resin.

French patent application No. 1,419,552, filed Oct. 23, 1958, describes insulation materials which include aqueous sodium silicate, polyisocyanate derivatives and resins.

U.S. Pat. No. 3,634,342 (issued Jan. 11, 1972) is directed to the addition of small quantities of aqueous sodium silicate to polyurethane foam to permit the foam to be depotted when that is desired. The amount of alkali metal silicate for this purpose is from 0.5 to 5.0%. The reference indicates that the action was too rapid to control when the amount of sodium silicate exceeded 5.0%.

Conventional polyurethane foam products are inflammable and their use in building products is discouraged. By employing selected polyester resins as the starting polyol ingredient, it is possible to produce a polyurethane foam which has a low flame spread rating (less than 25) in the STEINER tunnel test, ASTM E-84. See U.S. Pat. No. 3,676,376. The preparation and use of such acceptable flame retardant polyurethane foams is expensive because of the cost of the polyester resin.

SUMMARY OF THE INVENTION

The present invention provides a means for reducing the cost of flame retardant polyurethane foam systems and retaining acceptable densities (1.5 to 4.5 pounds per cubic foot) and acceptable thermal conductivity values (K-factor less than 0.26 BTU/hr./sq. ft./° F). According to the present invention, a polyurethane foam system of the type described in U.S. Pat. No. 3,676,376 is modified by the addition of aqueous sodium silicate having a ratio of $SiO_2/Na_2O$ from 2.4 to 3.0 and a water content from 30 to 60 percent by weight. The amount of aqueous sodium silicate included in the formulation is from 30 to 60 percent. Accordingly the overall foam system includes as its essential ingredients:

A. A polyisocyanate prepolymer or quasi-prepolymer;
B. A hydroxyl-terminated polyester having a viscosity greater than 100,000 cps (25° C);
C. A halogenated alkane blowing agent;
D. A catalyst for the reaction of —OH and —NCO groups;
E. A surfactant;
F. The described aqueous sodium silicate.

Each of the ingredients A through E are found in the polyurethane foam systems of U.S. Pat. No. 3,676,376. The aqueous sodium silicate of the present system serves to extend the polyurethane foam ingredients, retains the useful properties of the prior art polyurethane foam and also achieves a low smoke generation when exposed to fire. The aqueous sodium silicate constitutes from about 30 to about 60 parts by weight of the total polyurethane foam system according to the present invention. The polyisocyanate prepolymer or quasi-prepolymer is provided in a sufficient quantity to supply —N=C=O equivalents for combining with all of the —OH groups in the hydroxyl-terminated polyester and some portion of the uncombined water which is provided with the aqueous sodium silicate solution. That is, an excess of —N=C=O groups is supplied over that required to combine with all of the —OH groups of the hydroxyl-terminated polyester ingredient.

The foam can be applied by spraying or pouring. The foam can be produced in a free-rise system or in a confined mold system. The resulting foams in general develop densities from about 1.5 to 4.5 pounds per cubic foot.

DESCRIPTION OF THE PREFERRED EMBODIMENTS(S)

The present invention concerns the use of substantial quantities of aqueous sodium silicate as an ingredient in polyurethane foams produced by reaction of polyisocyanate prepolymers or quasi-prepolymers and hydroxyl-terminated polyesters having a viscosity greater than 100,000 cps (25° C).

The Silicate

The preferred aqueous sodium silicate exists in the form of mixtures of $SiO_2$ and $Na_2O$. The ratio of $SiO_2/Na_2O$ for the present purposes is preferably from 2.4 to 3.0. The water content of the aqueous sodium silicate for the present purposes is from 25 to 75 percent of the weight of the aqueous sodium silicate.

The Hydroxyl-Terminated Polyester

The hydroxyl-terminated polyester is the condensation reaction product of polycarboxylic acids with polyols. The hydroxyl-terminated polyester is maintained essentially anhydrous to minimize unwanted reaction of the —N=C=O groups of the polyisocyanate prepolymer or quasi-prepolymer during foam-formation.

Suitable polycarboxylic acids include phthalic, isophthalic, terephthalic, halogenated phthalic, halogenated isophthalic, halogenated terephthalic, adipic, azelaic, sebacic and others, including unsaturated polycarboxylic acids. Suitable polyols include diols, triols and some higher polyols, preferably aliphatic diols such as ethylene diol, propylene diol, butylene diol, hexane diol, polyethylene diol, polypropylene diol, glycerine and trimethylol pentane.

The viscosity of the hydroxyl-terminated polyester resin should be greater than 100,000 cps (measured at 25° C) so that the viscosity of the resulting foamable mixture will be in the range of 1000 to 2000 centipoises. The preferred polyester resin viscosity is approximately 140,000 centipoises (25° C).

The Polyisocyanate Prepolymer or Quasi-Prepolymer

The organic polyisocyanate prepolymer or quasi-prepolymer is the reaction product of at least one polyol with an excess of organic polyisocyanates. The reaction product has unreacted isocyanate radicals.

The term prepolymer is intended to identify those reaction products wherein substantially all of the polyisocyanate is reacted so that the reaction product contains essentially none of the starting polyisocyanate. The term quasi-prepolymer is intended to identify those reaction products which contain some of the starting polyisocyanate in an unreacted state. An example of the prepolymer is the adduct formed by reacting TDI (toluene diisocyanate) with glycol or other polyols to produce a product essentially free of unreacted TDI, yet having unreacted —NCO radicals. An example of a quasi-prepolymer is the product formed by combining a stoichiometric excess of polymethylene-polyphenylene-polyisocyanate with glycol. The product contains unreacted —NCO radicals, some of which are attached to polymethylene-polyphenylene-polyisocyanate which has not been reacted in the product.

The polyisocyanate prepolymer or quasi-prepolymer is maintained in essentially anhydrous condition since the —N=C=O groups react with water.

Reinforcing Modifiers

As a refinement of the present invention, improved strength properties are achieved when the foam forming mixture also includes reinforcing resins such as melamine-formaldehyde, methylolated melamine formaldehyde, urea formaldehyde and phenolic resins. The melamine and urea resins are useful when present in amounts from 0.1 to 5 weight percent of the formulation. Phenolic resins, either novolac or resol, are useful in quantities of about 0.1 to 2 weight percent of the formulation. The modifying resins generally increase the physical properties of the resulting foam, e.g., tensile and compressive strength. Formaldehyde alone also is a useful additive in quantities from 0.1 to 5 weight percent.

Catalyst

Several catalysts are contemplated in the present invention. The principal catalyst is the urethane catalyst which is employed to accelerate the reaction between —OH groups and —N=C=O groups. Examples are tin catalysts (stannous octoate; dibutyl tin dilaurate) and the amine catalysts (triethylene diamine; N,N,N',N'-tetra methyl butane diamine). The catalysts normally are provided in sufficient quantities to complete the urethane forming reaction. Generally polyurethane foam systems employ about 1 percent by weight of catalyst based on the total foam weight. In the present invention, the catalyst may be provided in lesser amounts. A preferred catalyst content is about 0.2 to 0.3 percent by weight of the total foam, although the catalyst may range from 0.1 to 3.0 percent of the weight.

A secondary catalyst may be employed to bring about the independent curing of reinforcing resins such as melamines or urea-formaldehydes. A typical secondary catalyst is para-toluene sulfonic acid which is supplied in accordance with the content of reinforcing resins, e.g., about 0.5 to 3 percent of the weight of the reinforcing resin.

Surfactants

The surfactant should be hydrolytically stable silicone materials. The amount of surfactant preferably ranges from about 0.5 to 0.75 percent by weight of the total foam.

Blowing Agents

The halogenated alkane blowing agents are included in the hydroxyl-terminated polyester component or in the polyisocyanate prepolymer or quasi-prepolymer component or divided between the two components. Fluorotrichloromethane is a preferred blowing agent.

Viscosity Considerations

The viscosity of the resulting mixture of hydroxyl-terminated polyester, polyisocyanate prepolymer or quasi-prepolymer, catalyst, surfactant, blowing agent and aqueous sodium silicate should be suitable to accomplish thorough dispersion of the ingredients in a mixing device. The dispersion should develop adequate flowing properties when the foaming mixture is deposited in a mold. The flowing properties are somewhat related to the gel time of the composition which in turn is related to the nature, amount and identity of the foaming catalyst. The viscosity should be sufficiently high to retard any collapsing tendency of the rising foam. Preferably the viscosity of the initial mixture should be within the range of 1,000 to 2000 centipoises.

The resulting sodium silicate extended polyurethane foam exhibits good adhesion to metal surfaces. The sodium silicate extended polyurethane foam has fire retardant properties which are superior to the fire retardant properties which would be achieved from the identical hydroxyl-terminated polyester and polyisocyanate prepolymer or quasi-prepolymer alone (assuming that proper stoichiometric adjustments are made for the comparison). The improved results are evidenced by flame spread tests and burnthrough tests. Sodium silicate extended polyurethane foam develops a dimensionally stable char when exposed to direct flame impingement. The char resists further burn-out of the subjacent sodium silicate extended polyurethane foam. The present sodium silicate extended polyurethane foam has good humid aging characteristics when exposed to 100% humidity at elevated temperatures. The thermal insulating of the present sodium silicate extended polyurethane foam can be less than a K-factor of 0.26 BTU/hr./sq. ft./° F.

The present sodium silicate extended polyurethane foam has a lower materials cost when compared with prior art organic polyurethane foam of the same density. The present sodium silicate extended polyurethane foam can be adapted to employ existing polyurethane foam technology and existing foam mixing and dispensing equipment including spray nozzles and the like.

When the sodium silicate extended polyurethane foam is compared with normal polyurethane foam of the same density, the tensile strength and compressive strength of the sodium silicate extended polyurethane foam is somewhat less but nonetheless commercially useful and significant.

EXAMPLE 1

A sodium silicate extended polyurethane foam is prepared by combining the following ingredients:

Component A 7,491 grams of hydroxyl-terminated polyester mixture hereinafter more particularly described;
24.75 grams of a silicone surfactant;
8.25 grams of a catalyst, specifically triethylene diamine;
1.65 grams of a catalyst which is N,N,N',N'-tetra methyl butane diamine;
173.75 grams fluorotrichloromethane.

The hydroxyl-terminated polyester mixture of Component A is a polyesterification product of 32.79 grams trimethylol propane;
3.73 grams 1,6-hexane diol;
13.68 grams adipic acid;
25.55 grams tetrabromophthalic anhydride.

These ingredients are cooked to an acid number less than 1. 71.6 parts by weight of this polyester are combined with 1.40 parts by weight of hydrolytically stable silicone fluid, 0.75 parts by weight of triethylene diamine solution, 26.1 grams of fluorotrichloromethane and 0.15 parts by weight N,N,N',N'-tetra methyl butane diamine. The described mixture totals 100 parts by weight and is the hydroxyl-terminated polyester ingredient of Component A.

Component B 7,491 grams of a polyisocyanate prepolymer, which is more fully described hereinafter;
749.1 grams of FREON 11B, i.e., fluorotrichloromethane;
2.80 grams of a silicone surfactant;
184.8 grams of a flame retardant additive, specifically a polymer containing chlorine and phosphate, having the structural formula (I):

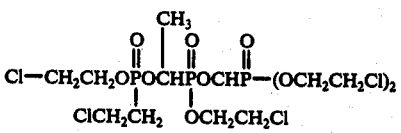

The polyisocyanate prepolymer described as an ingredient of Component B is formulated by combining 79.88 parts by weight of crude polymethylene polyphenylene diisocyanate;
2.50 parts by weight of methyl glucoside based polyether;
1.12 parts by weight silicone fluid;
16.50 parts by weight of polymer containing chlorine and phosphate (I).

The ingredients are mixed and heated to 170°-180° F and held at that temperature for about 1 hour until substantially all of the hydroxyl groups are combined with isocyanate groups. The resulting prepolymer material has a —N=C=O value of about 23-25.

Component C

Aqueous sodium silicate having a weight ratio of $SiO_2/Na_2O$ of 2.50;
a Baume density of 42;
a viscosity of 60 centipoises measured at 68° F;
a percentage of $Na_2O$ of 10.60 and a percentage of $SiO_2$ of 26.5.

The aqueous sodium silicate of this example is commercially available from Philadelphia Quartz Company under the grade designation STAR sodium silicate. The expression STAR sodium silicate is sometimes employed hereinafter to identify this aqueous sodium silicate which has been fully described in this Example 1.

All of the three components A, B and C are combined in the approximate ratio of 1 part A, 1.7 parts B, and 2.2 parts C. More specifically, 20.25 grams of A, 34.7 grams of B, and 45.05 grams of C are mixed in a paper cup with a rotary blade mixer for ten seconds until cream is observed. The mixed ingredients are allowed to rise in the paper cup to produce a uniformly cellular foam having a density of 3 pounds per cubic foot. The foam is white in color and has a uniform fine cell structure.

The aqueous sodium silicate constitutes 56.5 weight percent of the total formulation.

Polyurethane foam as described in Example 1 was deposited between two flat steel sheets 1¼ inches apart and measuring 36 × 45 inches. The sheets were clamped in fixed, parallel, opposed relation to each other. The creaming mixture was deposited and allowed to rise in contact with the two steel plates. The alkali metal silicate extended polyurethane foam exhibited good adhesion to the steel plates. The foam also exhibited good humid aging characteristics when exposed to ASTM test D-2247.

EXAMPLE 2

Component A was prepared by combining 26.4 pounds of the hydroxyl-terminated polyol described in Example 1;
3.5 pounds formaldehyde;
8.8 pounds melamine resin;
0.2 pounds catalyst, specifically p-toluene sulfonic acid; and
0.2 pounds of a reaction catalyst for urethane, specifically, a mixture of triethylene diamine and dimethyl ethanolamine.

Component B was prepared by combining 31.5 pounds of the polyisocyanate prepolymer of Example 1;
2.9 pounds of a silicone surfactant;
6.3 pounds polymer containing chlorine and phosphate (I); and
9.5 pounds fluorotrichloromethane.

Component C was 100 grams of STAR aqueous sodium silicate, hereinabove described.

A foam was prepared by combining 100 grams of Component C with 20.8 grams of Component A and 79.2 grams of Component B. The three components were mixed with a rotary mixer for 10 seconds at number 4 speed in a cup. The cream time was 30 seconds, the tack time was 120 seconds, the rise time was 210 seconds. The material was poured onto a steel plate at 108° F. The material produced a stable foam. After 24 hours a sample of the foam was cut. The cut sample evidenced no shrinkage. The foam had a density of 4.31 pounds per cubic foot. The closed cell content of the foam was 70.8%.

The aqueous sodium silicate constituted 50 weight percent of the total formulation.

EXAMPLE 3

23.2 grams of Component A (as in Example 2) and 88.4 grams of Component B (as in Example 2) were combined with 88.4 grams of STAR aqueous sodium silicate. The three components were mixed with a rotary mixer, number 4 speed, for 10 seconds and poured onto a steel plate at 104° F. The composition had a cream time of 30 seconds, a tack time of 120 seconds and a rise time of 210 seconds. A sample of the resulting foam exhibited no shrinkage after 24 hours. The foam had an average density of 3.13 pounds per cubic foot and an average closed cell concentration of 77.5%.

The aqueous sodium silicate constitutes 44.2 weight percent of the total formulation.

EXAMPLE 4

A foam was prepared incorporating methylolated urea. Component A was prepared by combining 78.3 grams of the hydroxyl-terminated polyol of Example 1;
10.4 grams of formaldehyde;
26.7 grams of methylolated urea;
0.6 grams catalyst (p-toluene sulfonic acid); and
0.6 grams of catalyst (mixture of triethylene diamine and dimethyl ethanolamine).

23.3 grams of the special Component A as just described was combined with 88.4 grams of Component C (STAR aqueous sodium silicate) and 88.4 grams of Component B as in Example 2. The mixture was mixed with a rotary mixer at number 4 speed for 10 seconds and poured onto a substrate at 108° F. The material had a cream time of 20 seconds, a tack time of 180 seconds and a rise time of 255 seconds. The material formed a foam which exhibited a slight shrinkage after 24 hours. The resulting foam had an average density of 4.26 pounds per cubic foot. The closed cell content was 67.5%. The tensile strength was 14.4 psi.

The aqueous sodium silicate constituted 44 weight percent of the total formulation.

EXAMPLE 5

This example, similar to Example 1, does not include melamine resin or formaldehyde.
Component A was prepared by combining 15.6 grams of the hydroxyl-terminated polyol of Example 1; and
0.12 grams of catalyst (mixture of triethylene diamine and dimethyl ethanolamine).

This Component A was combined with 88.4 grams of Component C (STAR aqueous sodium silicate). Mixing of the two Components A and C was difficult but adequate mixture was achieved. Thereafter 88.4 grams of Component B (as in Example 2) was combined and the ingredients were mixed with a rotary mixer for 10 seconds at number 4 speed and poured onto a substrate at 108° F. The cream time was 25 seconds, the tack time was 120 seconds and the rise time was 180 seconds. The foam exhibited a good, high rise and a firm set-up. There was a slight shrinkage after 24 hours. The closed cell content of the foam was 47.2%. The density was 2.82 pounds per cubic foot. The tensile strength was 18.1 psi. In the absence of formaldehyde and melamine the resulting foam generally has a lower closed cell content and reduced tensile strength.

The aqueous sodium silicate constituted 46 weight percent of the total formulation.

EXAMPLE 6

The present foam can be obtained in the absence of formaldehyde using a melamine resin alone.
Component A was prepared by combining 15.6 parts of the hydroxyl-terminated polyol of Example 1;
5.22 parts by weight of melamine resin;
0.12 parts of catalyst (p-toluene sulfonic acid); and
0.12 parts of catalyst (mixture of triethylene diamine and dimethyl ethanolamine).

This Component A was combined with 88.4 parts by weight of Component C (STAR aqueous sodium silicate). There was some emulsification difficulty during the mixing but ultimately adequate mixture was achieved. Thereafter 88.4 parts of Component B (as in Example 2) was mixed with Components A and C for 10 seconds at number 4 speed with a rotary mixer. The resulting mixture was applied to a substrate at 108° F. The cream time was 30 seconds, the tack time was 120 seconds and the rise time was 240 seconds. The foam exhibited a slight shrinkage after 24 hours. The density of the foam was 3.32 pounds per cubic foot. The closed cell content was 57.0%. The foam had a tensile strength of 17.5 psi.

The aqueous sodium silicate constituted 46 weight percent of the total formulation.

EXAMPLE 7

This example shows the use of a different hydroxyl-terminated polyester. Component A was prepared by combining the following ingredients:

78.3 grams Mobay Multron R-4;
10.4 grams formaldehyde;
26.1 grams melamine resin;
0.6 grams catalyst (p-toluene sulfonic acid);

0.6 grams catalyst (mixture of triethylene diamine and dimethyl ethanolamine).

The Multron R-4 is a saturated linear polyester having an equivalent weight of 200, an acid number of 4 and a hydroxyl value of 270 to 290. The material is commercially available as a polyol ingredient for use in urethane foams and elastomers. It is available from Mobay Chemical Company.

In order to prepare a foam, 23.3 grams of Component A as just described was combined with 88.4 grams of Component C (STAR aqueous sodium silicate) and 88.4 grams of Component B (as in Example 2). The three components were mixed with a rotary mixer for 10 seconds at number 4 speed and poured onto a substrate at 108° F. The material had a cream time of 35-40 seconds, a tack time of 210 seconds, a rise time of 300 seconds. The foam had a slow rise and remained soft. Aqueous sodium silicate could be squeezed from the foam. The foam was streaky and exhibited a nonhomogeneous cell structure. The foam had a density of 3.38 pounds per cubic foot. Closed cell content was 43.9 percent.

EXAMPLE 8

A foam was prepared with Diamond Shamrock Chemical Corporation aqueous sodium silicate grade 52 which has a $Na_2O$ content of 13.9 weight percent; a $SiO_2$ content of 33.4 weight percent; and a $SiO_2/Na_2O$ ratio of 2.40. The density is 52° Baume and the viscosity is 640 Stormer seconds. A sodium silicate extended polyurethane foam was prepared by combining 120 grams of Component C (grade 52 aqueous sodium silicate) with 32 grams of Component A (as in Example 2) and 120 grams of Component B (as in Example 2). The mixture was mixed with a rotary mixer for 5 seconds at 1900 RPM exhibiting a cream time of 15 seconds, a tack time of 60 seconds, and a rise time of 120 seconds. The foam had a density of 2.63 pounds per cubic foot, a tensile strength of 2.6 psi and a closed cell content of 32.7 percent.

The aqueous sodium silicate constituted 44 weight percent of the total formulation.

EXAMPLE 9

Component A was prepared by combining 67.5 parts by weight of the hydroxyl-terminated polyester of Example 1;
9 parts by weight formaldehyde (formalin);
22.5 parts by weight melamine resin;
0.5 parts by weight catalyst (paratoluene sulfonic acid); and
0.5 parts by weight catalyst (a mixture of triethylene diamine and dimethyl ethanolamine).

Component B was prepared by combining 62.8 parts by weight of polyisocyanate prepolymer of Example 1;
5.95 parts by weight of silicone surfactant;
12.54 parts by weight polymer containing chlorine and phosphate (I); and
18.90 parts by weight fluorotrichloromethane.

Component C was STAR aqueous sodium silicate.

This formulation, hereinafter referred to as "Example 9 formulation" is combined and mixed in the following proportions: 11.6 parts by weight Component A; 44.2 parts by weight Component B; 44.2 parts by weight Component C. The mixture exhibited a cream time of 30-40 seconds, a tack time of 3½ - 4 minutes and a rise time of 3½ - 4 minutes.

The "Example 9 formulation" was extensively tested with the following results.

A series of experimental panels was prepared with the "Example 9 formulation" sandwiched between two metal sheets. The "Example 9 formulation" foam had a density of 3.41 pounds per cubic foot and a closed cell content of 86% when the foam is formed under confinement between the metal sheets. The free rise properties of the "Example 9 formulation" foam showed a density of 2.42 pounds per cubic foot and a closed cell content of 77%.

Samples of the resulting "Example 9 formulation" foam from the metal sided panels had a tensile strength of 23.3 psi.

Each panel had a thickness of 1½ inches and an area of 35 × 45 inches. The panels were completely filled within about 25 seconds.

Corner Burning Tests

A modified corner burning test has been developed in which two panels, each 4 feet long, are fastened together to form a corner. Wood sticks, paper and gasoline are collected in the corner and ignited. The present "Example 9 formulation" foam did not exhibit any initial burst of flame. During the fire there was some light, white smoke. There was very little climbing of the flame over the panel surface. The panels had exposed foam on the fire side and metal skin on the surface away from the fire.

Burnthrough Tests

The U.S. Bureau of Mines has established a burnthrough test which employs a propane gas torch having its flame impinging at right angles to the surface of a slab of polyurethane foam having an area approximately 6 × 6 inches and thickness exactly one inch. The objective of the test is to determine the amount of time required for the flame to burst through the back side of the polyurethane slab from the time the torch is ignited. Conventional polyurethane foam exhibits burnthrough times of 10 seconds or less. A sample of the present "Example 9 formulation" foam required 180 seconds for burnthrough.

Thermal Conductivity

A sample of "Example 9 formulation" foam was tested for thermal conductivity properties. The sample was 1.04 inches thick, had a density of 3.44 pounds per cubic foot. Thermal conductivity factor K was 0.169 BTU/hr./sq. ft./° F. Temperature differential during the test was 97.4° F on the hot side and 52.5° F on the cold side.

Humidity Aging

The "Example 9 formulation" foam was subjected to humidity aging tests. Samples were maintained at 100% humidity and 120° F for extended periods of time. The properties of the samples at various times during the tests were measured. In each instance the sample was allowed to drain free of water before measurement. The results are set forth in the following table:

"EXAMPLE 9 FORMULATION"- HUMIDITY
AGING, 100% HUMIDITY AT 120° F

| Values | Initial | After 200 hrs. | After 500 hrs. | After 750 hrs. | After 1000 hrs. |
|---|---|---|---|---|---|
| % Closed Cells | 91.5 | 90.2 | 90.6 | 91.4 | 88.9 |
| Density, PCF | 3.03 | 3.42 | 3.23 | 3.22 | 3.80 |
| Tensile, psi | 23.4 | 32.7 | 38.0 | 18.1 | 21.5 |
| % Expansion | — | 2.3 | 3.4 | 3.9 | 5.0 |
| % Weight Change | — | 12.3 | 16.3 | 7.0 | 8.9 |

EXAMPLE 10

A foam system herein identified as the "Example 10 formulation" was prepared and tested.

Component A was prepared by combining:

| 380 | parts of the hydroxyl-terminated polyester of Example 1; |
|---|---|
| 50 | parts 37% formaldehyde (formalin); |
| 32.5 | parts melamine resin; |
| 1.5 | parts catalyst (p-toluene sulfonic acid); |
| 5 | parts catalyst (a mixture of triethylene diamine and dimethyl ethanolamine); |
| 15 | parts phenol type amine catalyst; |
| 7 | parts silicone surfactant; and |
| 90 | parts fluorotrichloromethane. |
| 507 | parts |

Component B was prepared by combining

| 330 | parts polyisocyanate prepolymer (formation hereinafter described); |
|---|---|
| 80 | parts polymer containing chlorine and phosphate (I); |
| 7 | parts silicone surfactant; and |
| 90 | parts fluorotrichloromethane. |
| 507 | parts |

Component C was prepared by combining 300 parts of foundry grade aqueous sodium silicate with 20 parts of water having a total of 320 parts. Specifically the aqueous sodium silicate was Diamond Shamrock Chemical Corporation grade 49FG having a $SiO_2/Na_2O$ ratio of 2.58 and a Baume gravity of 49°.

The mixing ratio to produce a foam is 40 parts by weight of Component A, 112 parts by weight of Component B and 150 parts by weight of Component C.

The polyisocyanate prepolymer in Component B is prepared by mixing 19 parts by weight of Papi-27 (a polyisocyanate of polymethylene polyphenylene having a functionality of about 3.0) with one part by weight of NPG (neopentyl glycol). The addition is carried out at about 230° F. The neopentyl glycol is added in approximately eight aliquot portions, one every 5 minutes with agitation. The reaction develops a strong exotherm. A final viscosity of the prepolymer in Component B ranges from about 185,000 to 200,000 cps.

The resulting foam has a cream time of 15 seconds, a tack time of 60 seconds and a rise time of 70 seconds. The foam has 76% closed cell content, 3.5 pounds per cubic foot density.

This material was subjected to a burnthrough test as described in Example 9. The burnthrough time was 13 minutes.

Composition of the Resulting Foam

X-ray analyses of products of Examples 1 and 18 indicated some crystalline silicates in the resulting foam. The foams also indicate an x-ray pattern which is characteristic of a complex sodium carbonate and sodium bicarbonate salt at a level of about 5 to 15% by weight. The complex salt has the following empirical structure:

$$Na_2CO_3 \cdot NaHCO_3 \cdot 2H_2O$$

It has been speculated that these complex salts are formed by reaction of the carbon dioxide which is evolved in the reaction of isocyanates with water. The carbon dioxide combines readily with the sodium silicate $Na_2SiO_2$ to form the sodium carbonates and bicarbonates. The sodium carbonate and bicarbonate complex readily absorbs water from the system as water of crystallization.

This mechanism in part accounts for the fact that the foam products appear to be essentially free of uncombined water despite the fact that the starting aqueous sodium silicate ingredient constitutes from about 7 to 50 percent of the weight of the resulting foam.

The rate at which the carbon dioxide is evolved from the foam seems to be important with respect to the character of the silica gel which results. Extremely rapid evolution of carbon dioxide gels $SiO_2$ in a glass type structure. A slow release of carbon dioxide tends to precipitate $SiO_2$ which forms spherical colloidal silica particles of approximately 15 millimicrons diameter. These silica particles thereafter form a gel. The analyses indicated that the silica gel in the present polyurethane foams is a hybrid mixture of the two types of gel just described.

EXAMPLE 11

A foam product was prepared utilizing the saturated polyester resin of Example 1 as the polyol ingredient and a polymeric MDI prepolymer as the isocyanate ingredient. Component A contained 11.51 parts by weight of the polyester, 3.00 parts by weight of fluorotrichloromethane, 1.0 parts by weight silicone fluid as a surfactant and 0.25 parts by weight of a mixture of triethylene diamine and dimethyl ethanolamine as a catalyst.

The polyisocyanate prepolymer was formed by combining polymeric MDI, a sorbitol polyether having the hydroxyl value of 490–500, a silicone fluid as a surfactant and polymer containing chlorine and phosphate (I). The prepolymer had an —NCO content of 23 to 24 percent by weight.

Component B was prepared by combining 33.52 parts by weight of the described polyisocyanate prepolymer; 1.22 parts by weight of silicone fluid as a surfactant; and 5.38 parts by weight of fluorotrichloromethane as a blowing agent.

Component C was STAR aqueous sodium silicate.

The three components A, B and C were mixed and allowed to rise freely to produce a foam product. The weight proportions of the three components are set forth in the following table along with product density values, closed cell content and oxygen index values for selected samples. A thermoset foam product was generated.

PROPERTIES OF FOAM PRODUCTS

| SPECIMEN | COMPONENT A | COMPONENT B | COMPONENT C | DENSITY p.c.f. | % CLOSED CELL | OXYGEN INDEX |
|---|---|---|---|---|---|---|
| I | 11.9 | 42.7 | 45.4 | 4.2 | 25.1 | 29.0 |
| II | 7.35 | 27.7 | 65.0 | 8.0 | 36.7 | 38 |

Note
Specimen II also included 0.22% by weight dibutyl tin dilaurate as catalyst.

EXAMPLE 12

A foam was prepared employing a non-halogenated saturated polyester resin as the polyol ingredient. Specifically a polyester resin was prepared from adipic acid, trimethylol propane and diethylene glycol cooked to a final acid value of about 3.0 and a final hydroxyl value of about 400. Component A was prepared by combining 11.51 parts by weight of the described saturated polyester with 3.00 parts by weight fluorotrichloromethane, 0.25 parts by weight of a mixture of triethylene diamine and dimethyl ethanolamine as a catalyst and 1.00 parts by weight of a silicone fluid as a surfactant.

Component B was the same as that described in Example 20. Component C was aqueous sodium silicate (STAR).

A foam was prepared by combining 11.6 parts by weight of Component A, 43.3 parts by weight Component B, 43.2 parts by weight Component C and 1.8 parts by weight of additional fluorotrichloromethane. The ingredients were mixed for 10 seconds and poured into a heated mold at about 60° C. A satisfactory thermoset foam was developed.

EXAMPLE 13

A foam was prepared employing formaldehyde alone as a modifying additive. Components B and C were the same as described in Example 11. Component A included 10.14 parts by weight of a polyester resin of Example 11, 1.34 parts by weight of formalin (37% solution of formaldehyde in water) and 0.27 parts by weight of a mixture of triethylene diamine and dimethyl ethanolamine as a catalyst.

A foam was prepared by combining 11.8 parts by weight Component A, 44.1 parts by weight each of Components B and C. The materials were mixed for 14 seconds. The mixture creamed in 20 seconds and had a rise time of 80 seconds. The foam had a compressive strength parallel to the rise of 38.8 psi and an oxygen index of 31.1.

EXAMPLE 14

A foam was prepared employing phenolic resins as a reinforcing resin. The specific resin was an alkali-catalyzed, water-soluble phenol-formaldehyde resin containing 63% by weight nonvolatile material in water. The material is commercially available for normal use as a low ash binder resin. Components B and C were the same as in Example 11. Component A was prepared by combining 9.45 parts by weight of the saturated polyester resin of Example 11; 2.06 parts by weight of the aqueous phenolic resin and 0.24 parts by weight of the catalyst, a mixture of triethylene diamine and dimethyl ethanolamine. The foam was prepared by combining 11.8 parts of the described Component A and 44.1 parts by weight each of Components B and C. The resulting foam appeared to shrink after formation. The foam exhibited an oxygen index of 29.8.

Only small quantities of the aqueous phenolic resins can be employed since the phenolic resins tend to form silica gels instantaneously when mixed with aqueous sodium silicate.

We claim:
1. A process for producing a rigid foam structure having a density of 1.5 to 4.5 pounds per cubic foot and a K-factor less than 0.26 which comprises reacting together as a foam forming formulation
   A. a hydroxyl-terminated polyester having a viscosity greater than 100,000 cps at 25° C;
   B. an organic polyisocyanate prepolymer or quasi-prepolymer prepared by reacting at least one polyol with an excess of organic polyisocyanate;
   C. aqueous sodium silicate having a weight ratio of $SiO_2/Na_2O$ of 2.4 to 3.0 and an aqueous content of 25 to 75 percent by weight;
wherein at least one of the three components (A, B, C) contains a dissolved halogenated alkane blowing agent; in the presence of a surfactant and a catalyst for the reaction of —OH and —N═C═O radicals; and wherein the weight of said aqueous alkali metal silicate constitutes from 30 to 60 percent of the components.

2. A homogeneous polyurethane foam, essentially free of uncombined water, formed by the process of claim 1.

3. The process of claim 1 wherein the said foam forming formulation includes 0.5 to 5.0 percent by weight of an organic condensable resin selected from the class consisting of melamine-formaldehyde, urea-formaldehyde and methylolated melamine-formaldehyde; and also includes a catalyst for the condensation of melamine resins.

4. The process of claim 1 wherein the said foam forming formulation includes 0.5 to 2.0 percent by weight of a phenolic resin.

5. The process of claim 1 wherein the said foam forming formulation includes 0.1 to 5.0 percent by weight of formaldehyde.

* * * * *